United States Patent
Takahashi et al.

(10) Patent No.: US 11,400,706 B2
(45) Date of Patent: Aug. 2, 2022

(54) INFORMATION PROCESSING APPARATUS AND COMPUTER READABLE MEDIUM

(71) Applicant: FUJIFILM Business Innovation Corp., Tokyo (JP)

(72) Inventors: Ryosuke Takahashi, Kanagawa (JP); Yasuhiro Otsuka, Yokohama (JP)

(73) Assignee: FUJIFIIM Business Innovation Corp., Tokyo (JP)

( * ) Notice: Subject to any disclaimer, the term of this patent is extended or adjusted under 35 U.S.C. 154(b) by 93 days.

(21) Appl. No.: 17/007,050

(22) Filed: Aug. 31, 2020

(65) Prior Publication Data
US 2021/0245501 A1 Aug. 12, 2021

(30) Foreign Application Priority Data

Feb. 12, 2020 (JP) .............................. JP2020-021568

(51) Int. Cl.
B41J 29/393 (2006.01)
B41J 2/045 (2006.01)

(52) U.S. Cl.
CPC ................................. *B41J 2/04558* (2013.01)

(58) Field of Classification Search
CPC ................ B41J 2/04535; B41J 2/04558; B41J 2/04566; B41J 20/4571; B41J 2/04593; B41J 2/04595; B41J 11/009; B41J 2203/01; B41J 2203/011; B41J 29/393
See application file for complete search history.

(56) References Cited

U.S. PATENT DOCUMENTS

| | | | | |
|---|---|---|---|---|
| 6,102,507 A * | 8/2000 | Yoshida | ................... | B41J 2/195 347/6 |
| 6,585,340 B1 * | 7/2003 | Borrell | ................ | H04N 1/6033 358/1.9 |
| 2005/0219283 A1 * | 10/2005 | Kachi | .................... | B41J 29/393 347/6 |
| 2007/0206039 A1 * | 9/2007 | Kawamura | ............ | B41J 11/009 347/14 |
| 2008/0143776 A1 * | 6/2008 | Konno | ................... | B41J 2/2132 347/19 |
| 2014/0354716 A1 * | 12/2014 | Saito | ....................... | G01N 19/10 347/14 |
| 2016/0103632 A1 * | 4/2016 | Kawaguchi | ........... | G06T 7/0004 347/19 |
| 2016/0103633 A1 * | 4/2016 | Huijbers | ............... | G06F 3/1234 347/16 |

FOREIGN PATENT DOCUMENTS

JP 4720274 4/2011
WO WO-2016148021 A1 * 9/2016 .......... B41J 11/0015

OTHER PUBLICATIONS

English language machine translation of JP 4720274.

* cited by examiner

*Primary Examiner* — Julian D Huffman
(74) *Attorney, Agent, or Firm* — Fildes & Outland, P.C.

(57) ABSTRACT

An information processing apparatus includes a processor configured to: acquire physical property information on physical properties of a recording medium and physical properties of ink to be ejected onto the recording medium and setting information on a setting of a device configured to eject the ink onto the recording medium; derive an action amount using the physical property information and the setting information, the action amount relating to action of the recording medium applied by the ink ejected onto the recording medium; and output the action amount.

15 Claims, 6 Drawing Sheets

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2020-21568 filed on Feb. 12, 2020.

BACKGROUND

Technical Field

The present disclosure relates to an information processing apparatus and a computer readable medium.

Related Art

Japanese Patent No. 4720274 discloses an apparatus for simulating a shape of ink dots formed on a print medium at a time of printing a printed image, the apparatus including: a peripheral chit indicating a total amount of ink of ink dots to be formed in a peripheral area set around a pixel of interest; a reference data storage unit that stores dot shape data indicating a relationship with a spread shape of ink dots to be formed in the pixel of interest; a dot data generation unit that generates dot data indicating a formation state of the ink dots of each pixel on the print medium; a dot shape calculation unit that calculates the spread shape of each ink dot to be formed on the print medium according to the dot data by referring to the dot shape data; and an image quality evaluation index calculation unit that calculates an image quality evaluation index for evaluating an image quality of the print based on the spread shape of each ink dot calculated by the dot shape calculation unit.

SUMMARY

In an ink jet recording type image forming apparatus, there is a technique of evaluating an image to be formed on a recording medium by simulating a behavior of an ink that wets the recording medium and spreads on the recording medium when the ink is ejected onto the recording medium.

However, the number of ink droplets ejected onto the recording medium is enormous, and enormous calculation processing is required to simulate a behavior of each ink for art entire region to be printed. Since the behavior of the ink changes according to a setting (hereinafter referred to as "setting information") of the image forming apparatus at a time of printing that is related to the recording medium, the ink, and the like, it takes a lot of time to reflect the setting information and simulate the accurate behavior of the ink.

Aspects of non-limiting embodiments of the present disclosure relate to an information processing apparatus and a computer readable medium storing a program with which processing time for deriving information on a quality of an image to be formed on a recording medium may be reduced, as compared with a case of simulating a behavior of each ink for an entire region to be printed.

Aspects of certain non-limiting embodiments of the present disclosure address the above advantages and/or other advantages not described above. However, aspects of the non limiting embodiments are not required to address the advantages described above, and aspects of the non-limiting embodiments of the present disclosure may not address advantages described above.

According to an aspect of the present disclosure, there is provided an information processing apparatus including a processor configured to: acquire physical property information on physical properties of a recording medium and physical properties of ink to be ejected onto the recording medium and setting information on a setting of a device configured to eject the ink onto the recording medium; derive an action amount using the physical property information and the setting information, the action amount relating to action of the recording medium applied by the ink ejected onto the recording medium; and output the action amount.

BRIEF DESCRIPTION OF DRAWINGS

Exemplary embodiment(s) of the present invention will be described in detail based on the following figures, wherein.

DETAILED DESCRIPTION

An exemplary embodiment of the present disclosure will be described in detail below with reference to the drawings. An information processing apparatus 10 according to the present exemplary embodiment is, for example, a server configured to acquire a setting value from an image forming apparatus and to evaluate an image to be formed using acquired information. However, the present invention is not limited thereto. The information processing apparatus 10 may be, for example, a terminal such as a personal computer and a tablet, or an image forming apparatus.

Figure 1:
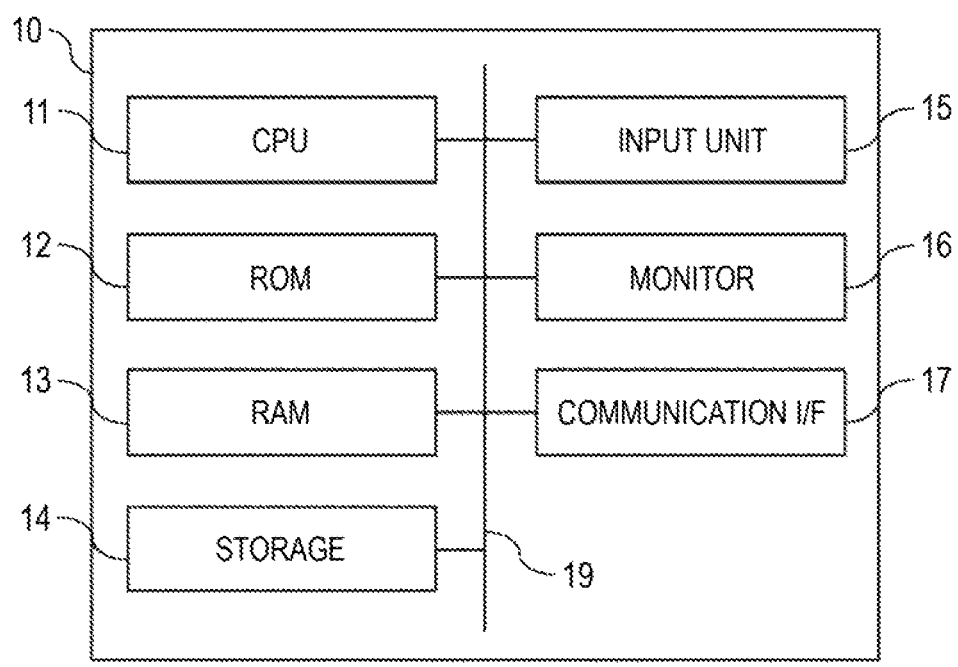
FIG. 1 is a block diagram showing an example of a hardware configuration of an information processing apparatus according to an exemplary embodiment.

A hardware configuration of the information processing apparatus 10 will be described with reference to FIG. 1. FIG. 1 is a block diagram showing an example of the hardware configuration of the information processing apparatus 10 according to the present exemplary embodiment. As shown in FIG. 1, the information processing apparatus 10 according to the present exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to one another by a bus 19. Here, the CPU 11 is an example of a processor.

The CPU 11 is configured to control the entire information processing apparatus 10. The ROM 12 is configured to store various programs and data including an information processing program used in the present exemplary embodiment. The RAM 13 is a memory used as a work area when the various programs are executed. The CPU 11 is configured to execute information processing by loading the program stored in the ROM 12 into the RAM 13 and executing the program. The storage 14 is, for example, a hard disk drive (HDD), a solid state drive (SSD), a flash memory, or the like. The storage 14 may store information related to the information processing program and various data acquired from the image forming apparatus. The input unit 15 is a mouse and a keyboard that are configured to input characters and the like. The monitor 16 is configured to display image data, characters, and the like. The communication I/F 17 is configured to transmit and receive data.

Figure 2:
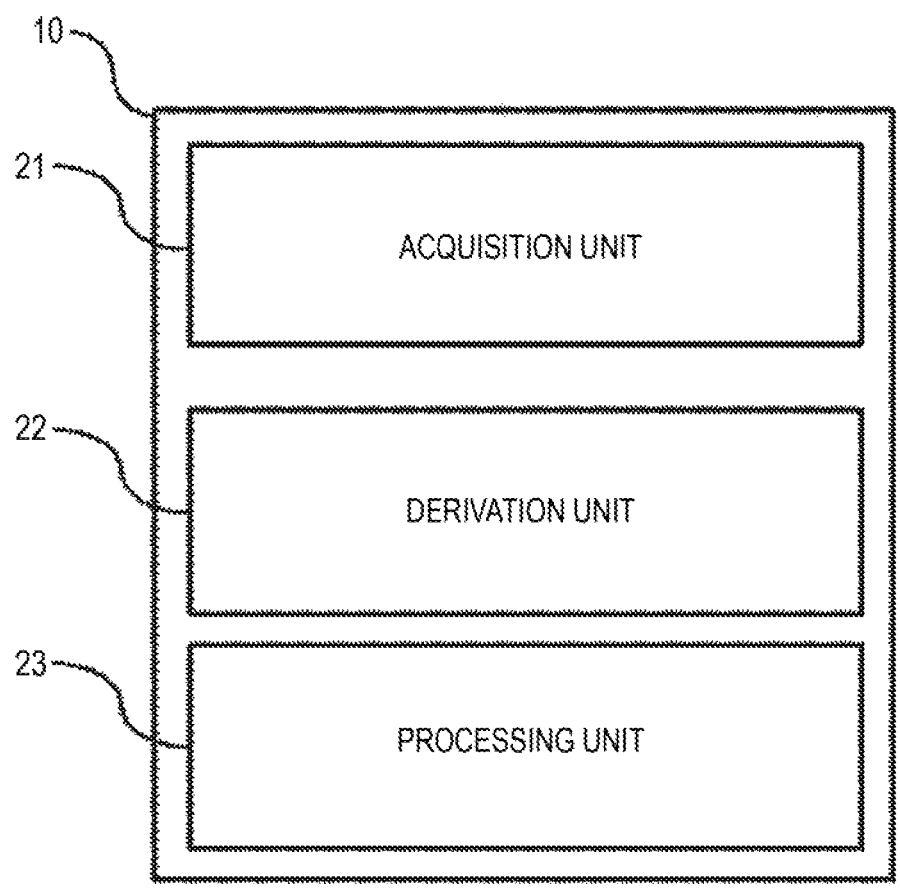
FIG. 2 is a block diagram showing an example of a functional configuration of the information processing apparatus according to the present exemplary embodiment.

Next, a functional configuration of the information processing apparatus 10 will be described with reference to FIG. 2. FIG. 2 is a block diagram showing an example of the functional configuration of the information processing apparatus 10 according to the present exemplary embodiment.

As shown in FIG. 2, the information processing apparatus 10 includes an acquisition unit 21, a derivation unit 22, and a processing unit 23. The CPU 11 executes the information processing program to function as the acquisition unit 21, the derivation unit 22, and the processing unit 23.

The acquisition unit 21 is configured to acquire information (hereinafter referred to as "physical property information") on physical properties of a recording medium and physical properties of an ink to be ejected onto the recording medium and information (hereinafter referred to as "setting information") on a setting of the image forming apparatus that ejects the ink onto the recording medium. Here, the physical properties of the recording medium acquired by the acquisition unit 21 are, for example, surface tension of the recording medium, an average pore diameter of the recording medium, surface uneven shape distribution of the recording medium, the Young's modulus of the recording medium, an area of a surface of the recording medium on which an image is formed, and a thickness of the recording medium. The physical properties of the ink are surface tension and viscosity of the ink. The setting of the image forming apparatus is a volume of the ink to be ejected, a distance between nozzles, a printing speed, a distance between heads, and a ratio (hereinafter referred to as "image density") of a region where the ink is ejected to the recording medium. A mode will be described in which the image density according to the present exemplary embodiment is a ratio of the number of ejected inks to the number of pixels of the recording medium. However, the present invention is not limited thereto. The image density may be a total area of the ejected inks with respect to an area of the recording medium.

The derivation unit 22 derives, using the physical property information and the setting information, an action amount relating to action of the recording medium applied by the ink ejected onto, the recording medium in the ejected ink.

Specifically, the derivation unit 22 derives an amount of deformation of the recording medium due to swelling of the recording medium, as the action amount. For example, the ink ejected onto the recording medium permeates the recording medium over time and affects a strength of the recording medium. Therefore, the recording medium is likely to be wrinkled due to action of the ink which has been ejected and has permeated the recording medium.

In the present exemplary embodiment, a mode will be described in which the amount of deformation (deformation amount) of the recording medium is derived as the action amount. However, the present invention is not limited thereto. For example, a swelling ratio of the recording medium or rigidity of, the recording medium may be derived as the action amount.

The derivation unit 22 derives the amount of deformation of the recording medium using a total permeation amount of the ink which has permeated the recording medium and the rigidity of the recording medium, and derives the total permeation amount of the ink using the image density and a permeation coefficient. A mode will be described in which the rigidity according to the present exemplary embodiment is bending rigidity. However, the present invention is not limited thereto. For example, the rigidity may be axial rigidity, shear rigidity, or torsional rigidity.

The processing unit 23 is configured to output the derived action amount, and to evaluate a quality of an image to be formed on the recording medium using the action amount. Specifically, in a case where the action amount exceeds a predetermined threshold value, the processing unit 23 notifies that a quality of the image is poor, or notifies the setting information (for example, the printing speed and the image density) to achieve the action amount equal to or lower than the predetermined threshold value.

A mode has described in which the processing unit 23 according to the present exemplary embodiment performs the notification in a case where the action amount exceeds the predetermined threshold value. However, the present invention is not limited thereto. In a case where the action amount exceeds the threshold value, the processing unit 23 may correct the setting information to achieve the action amount, equal to or lower than the threshold value. Specifically, the processing unit 23 may correct at least one of the printing speed and the image density included in the setting information to achieve the action amount equal to or lower than the threshold value. The threshold value according to the present exemplary embodiment is not particularly limited. For example, a predetermined value may be set as the threshold value.

Next, a method of deriving the action amount according to the present exemplary embodiment will be described with reference to FIGS. 3 to 6 before operation of the information processing apparatus 10 is described.

Figure 3:
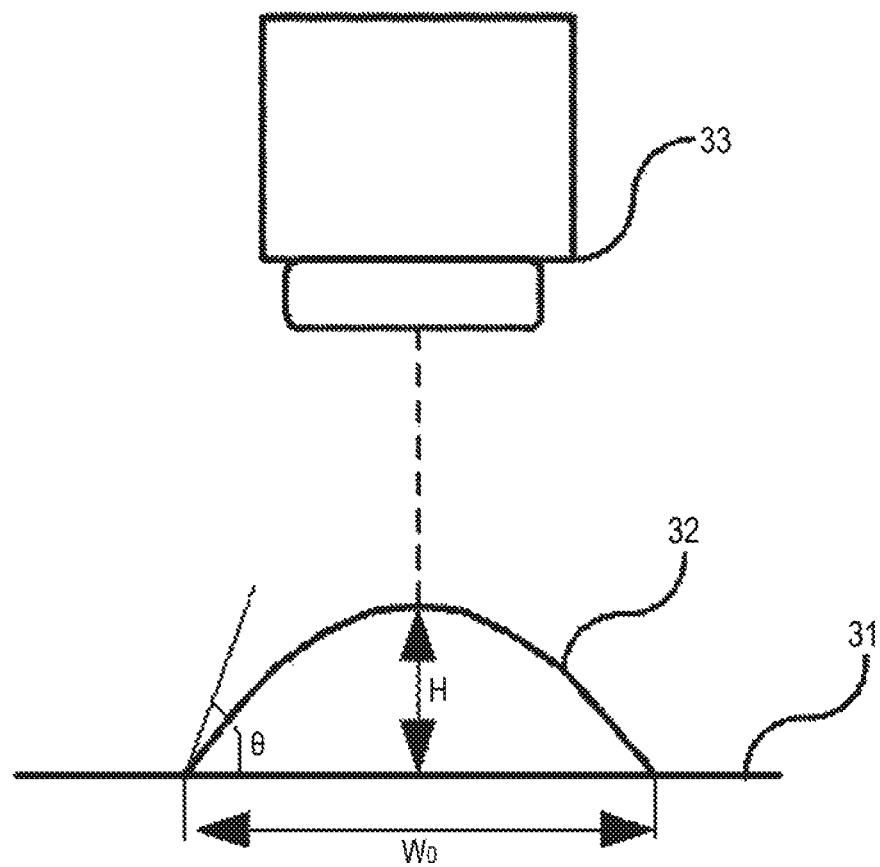
FIG. 3 is a schematic view illustrating an example of an ink ejected onto the recording medium according to the present exemplary embodiment.

Next, the ink 32 ejected onto the recording medium 31 will be described with reference to FIG. 3. FIG. 3 is a schematic view illustrating an example of the ink 32 ejected onto the recording medium 31 according to the present exemplary embodiment.

As illustrated in FIG. 3, when the ink 32 ejected from a nozzle 33 of the image forming apparatus comes into contact with the recording medium 31, a droplet is formed on the recording medium 31.

The information processing apparatus 10 acquires physical property information (an average pore diameter, surface uneven shape distribution, a thickness, an area, and the Young's modulus of the recording medium 31, viscosity of the ink, surface tension, and the like). Here, the surface tension includes surface tension of the recording medium 31, surface tension of the ink 32, and surface tension between the recording medium 31 and the ink 32. A mode has been described in which the information processing apparatus 10 according to the present exemplary embodiment acquires the average pore diameter, the surface uneven shape distribution, the thickness, the area, and the Young's modulus of the recording medium 31, the viscosity of the ink, and the surface tension as the physical property information. However, the present invention is not limited thereto. The information processing apparatus 10 may acquire information on physical properties which are an electrical resistance value, electrical conductivity, electrical polarizability, and the like of the recording medium 31 and the ink 32 as the physical property information.

The information processing apparatus 10 acquires the setting information (a volume of the ink, a distance between nozzles, a printing speed, a distance between heads, and an image density) of the image forming apparatus. The volume of the ink according to the present exemplary embodiment is constant, and the printing speed is a speed at which the ink is ejected from ejection of an ink to ejection of a next ink.

The information processing apparatus 10 derives, using the acquired physical property information, the contact angle of the recording medium 31 illustrated in FIG. 3, a permeation coefficient when the ink 32 permeates the recording medium 31, and the rigidity of the recording medium 31 indicating the strength. The contact angle, the permeation coefficient, and the rigidity are expressed by the following equations.

$$\cos\theta = \frac{\sigma_s - \sigma_{fs}}{\sigma_f} \quad (1)$$

$$\beta = \sqrt{\frac{r\sigma_f \cos\theta}{2\mu}} \quad (2)$$

$$I = E \cdot d^3 \quad (3)$$

Here, $\theta$ is the contact angle of the ink 32 in contact with the recording medium 31, $\sigma_s$ is the surface tension of the recording medium 31, $\sigma_f$ is the surface tension of the ink 32, and $\sigma_{fs}$ is the surface tension between the recording medium 31 and the ink 32. $\beta$ is the permeation coefficient, r is the average pore diameter of the recording medium 31, and $\mu$ is the viscosity of the ink 32. I is the rigidity of the recording medium 31, E is the Young's modulus of the recording medium 31, and d is the thickness of the recording medium 31.

As illustrated in FIG. 3, the wetting and spreading width of the ink 32 formed on the recording, medium 31 is expressed by the following equations.

$$\tan\theta = \frac{2H}{W_0} \quad (4)$$

$$V_0 = \frac{\pi}{6} H \left\{ 3 \left( \frac{W_0}{2} \right)^2 + H^2 \right\} \quad (5)$$

Here, H is a height of a vertex of the ink 32, and $V_0$ is the volume of the ink 32.

That is, using Equations (1), (4), and (5), the wetting and spreading width $W_0$ of the ink 32 is expressed using the volume and surface tension of the ink 32. That is, the wetting and spreading width $W_0$ is derived using the acquired physical property information.

Figure 4:
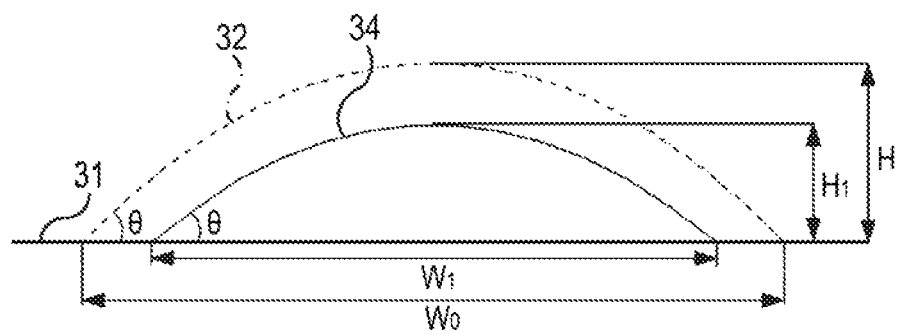
FIG. 4 is a schematic view illustrating an example of the ink which permeates the recording medium according to the present exemplary embodiment.
Figure 5:
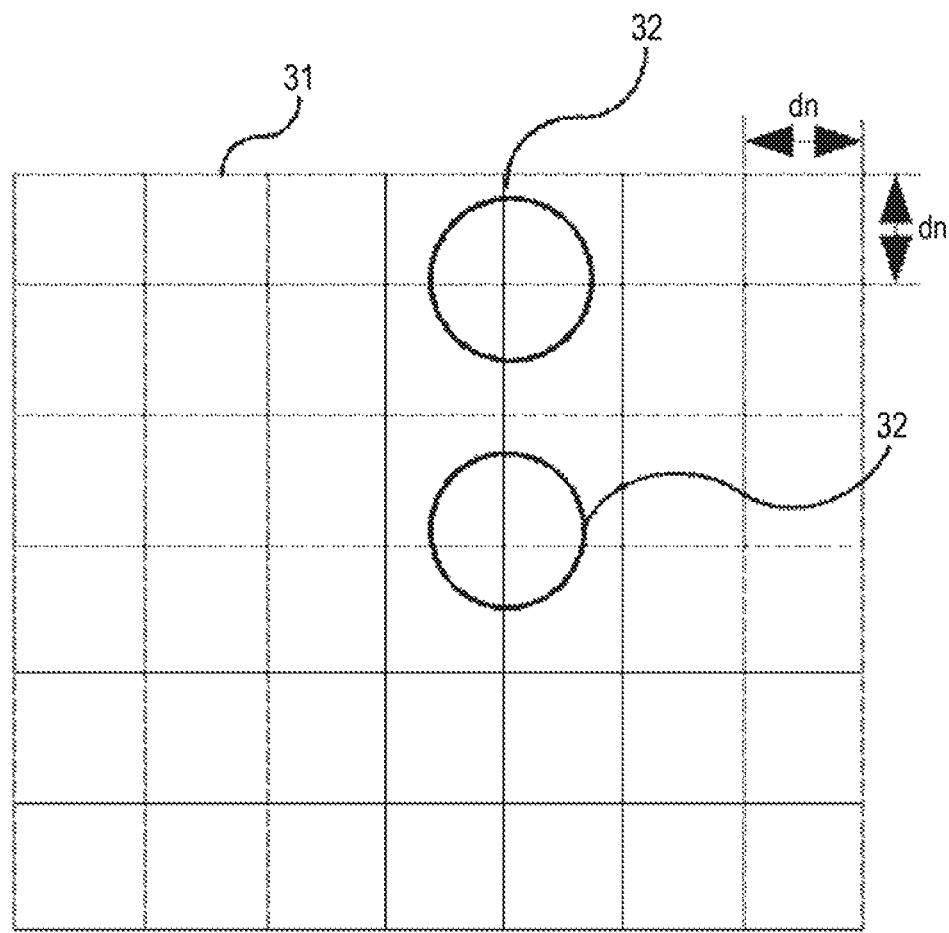
FIG. 5 is a schematic diagram showing an example of the recording medium for describing the number of pixels of the recording medium according to the present exemplary embodiment.

Next, a method of deriving the amount of deformation of the recording medium 31 due to swelling will be described with reference to FIGS. 4 and 5. FIG. 4 is a schematic view illustrating an example of the ink which permeates the recording medium 31 according to the present exemplary embodiment. FIG. 5 is a schematic diagram showing an example of the recording medium 31 for describing the number of pixels of the recording medium 31 according to the present exemplary embodiment.

As illustrated in FIG. 4, when any time has elapsed, the ink 32 ejected onto the recording medium 31 permeates the recording medium 31. The volume and the wetting and spreading width of the ink 34 remaining on the recording medium 31 decrease as compared with those of the ink 32 immediately after the ejection. Here, any time that has elapsed is expressed by the following equation.

$$t = \frac{d_h}{v} \quad (6)$$

Here, t is the time from the ejection of the ink 32 to the ejection of the next ink, and v is a printing speed at which the next ink is ejected after the ink 32 is ejected, and $d_h$ is a distance between the heads of the image forming apparatus. When it is considered that the ink which permeates the recording medium 31 decreases as time elapses, the time from the ejection of the ink to the ejection of the next ink is expressed by the following equation.

$$t = \exp\left(-k_1 \frac{d_h}{v}\right) \quad (7)$$

Here, is any coefficient. k1 is derived in consideration of the contact area of the recording medium 31 and the degree of filling of the gap on the recording medium 31.

The amount of the ink which has permeated the recording medium 31 is expressed by the following equation using Equations (2) and (6) or (7) described above and the wetting and spreading width $W_0$ of the ink 32 immediately after the ejection.

$$\Delta V_1 = \frac{\pi}{4} \beta \sqrt{t} \, W_0^2 \quad (8)$$

Here, $\Delta V_1$ is the amount of the ink which permeates the recording medium 31 from the surface where the ink 32 is in contact with the recording medium.

Equation (8) described above expresses a permeation amount of the ink which permeates the recording medium 31 per droplet. When the total number of inks ejected to the entire recording medium 31 is known, a total permeation amount of the ink which permeates the recording medium 31 is derived using Equation (8) and the total number of the inks. The total permeation amount of the ink which permeates the recording medium 31 is expressed by the following equations.

$$N = \frac{A}{d_n^2} \cdot C_{in} \quad (9)$$

$$V_{all} = \Delta V_1 \cdot N \quad (10)$$

Here, N is the total number of the ejected ink, A is an area of the recording medium 31, and $d_n$ is the distance between the nozzles of the image forming apparatus, $C_{in}$ is the image density, and $V_{all}$ is the total permeation amount of the ink which permeates the recording medium 31.

As shown in FIG. 5, if the ink 32 is ejected fin each distance $d_n$, between the nozzles, the area A of the recording medium 31 is obtained by multiplying the number (the number of intersections shown in FIG. 5) of pixels of the recording medium 31 by an area (a square of the distance $d_n$ between the nozzles) of the recording medium 31 per nozzle. In other words, the number of pixels of the recording medium 31 is derived by dividing the area A of the recording medium 31 by the area (the square of the distance $d_n$ between the nozzles) per nozzle. As indicated by Equation (9) described above, the total number N of the inks to be ejected when an image is formed is derived by multiplying the number of pixels of the recording medium 31 by the image density $C_{in}$.

As indicated by Equation (10) described above, the total permeation amount of the ink 32 which permeates the recording medium 31 is derived by multiplying the permeation amount $\Delta V_1$ of the ink which permeates the recording medium 31 by the total number N of the inks.

The amount of deformation of the recording medium 31 due to the action of the ink 32 which permeates the recording medium 31 is derived using Equations (3) and (10) described above. The amount of deformation of the recording medium 31 is expressed by the following equation.

$$C = k_2 \cdot \frac{V_{all}}{I} + k_3 \quad (11)$$

Here, C is the amount of deformation of the recording medium 31, and $k_2$ and $k_3$ are any coefficient.

As indicated by Equation (11), the larger the total permeation amount $V_{all}$ of the ink 32, the larger the amount C of deformation of the recording medium 31 due to the action of the ink 32 which permeates the recording medium 31 is, and the larger the rigidity I of the recording medium 31, the smaller the amount C of deformation of the recording medium 31 is. That is, Equation (11) indicates that when the recording medium 31 is permeable paper that the ink 32 easily permeates, or when the recording medium 31 is thin paper having a small thickness, the recording medium 31 is likely to be wrinkled.

Figure 6:
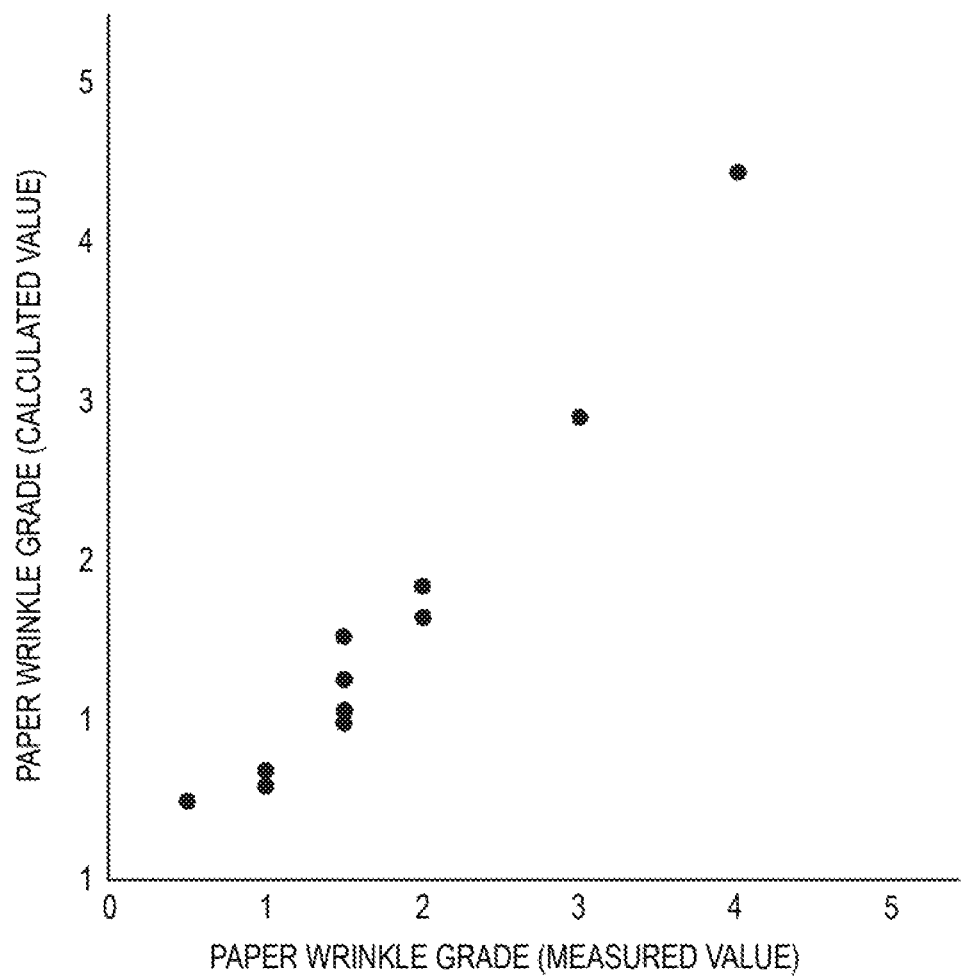
FIG. 6 is a graph showing an example of measured values and calculated values of a paper wrinkle grade according to the present exemplary embodiment.

Next, with reference to FIG. 6, a comparison result between the amount of deformation of the recording medium 31 derived by the simulation and the amount of deformation of the recording medium 31 obtained by ejecting the ink and actually performing measuring will be described. FIG. 6 is a graph showing an example of measured values and calculated values of a paper wrinkle grade according to the present exemplary embodiment.

FIG. 6 shows that there is a correlation between the calculated values and the measured values of the paper wrinkle grade. Here, the paper wrinkle grade refers to a degree of wrinkles that occur on the recording medium 31. The paper wrinkle grade according to the present exemplary embodiment is an example of the amount of deformation of the recording medium 31.

Figure 7:
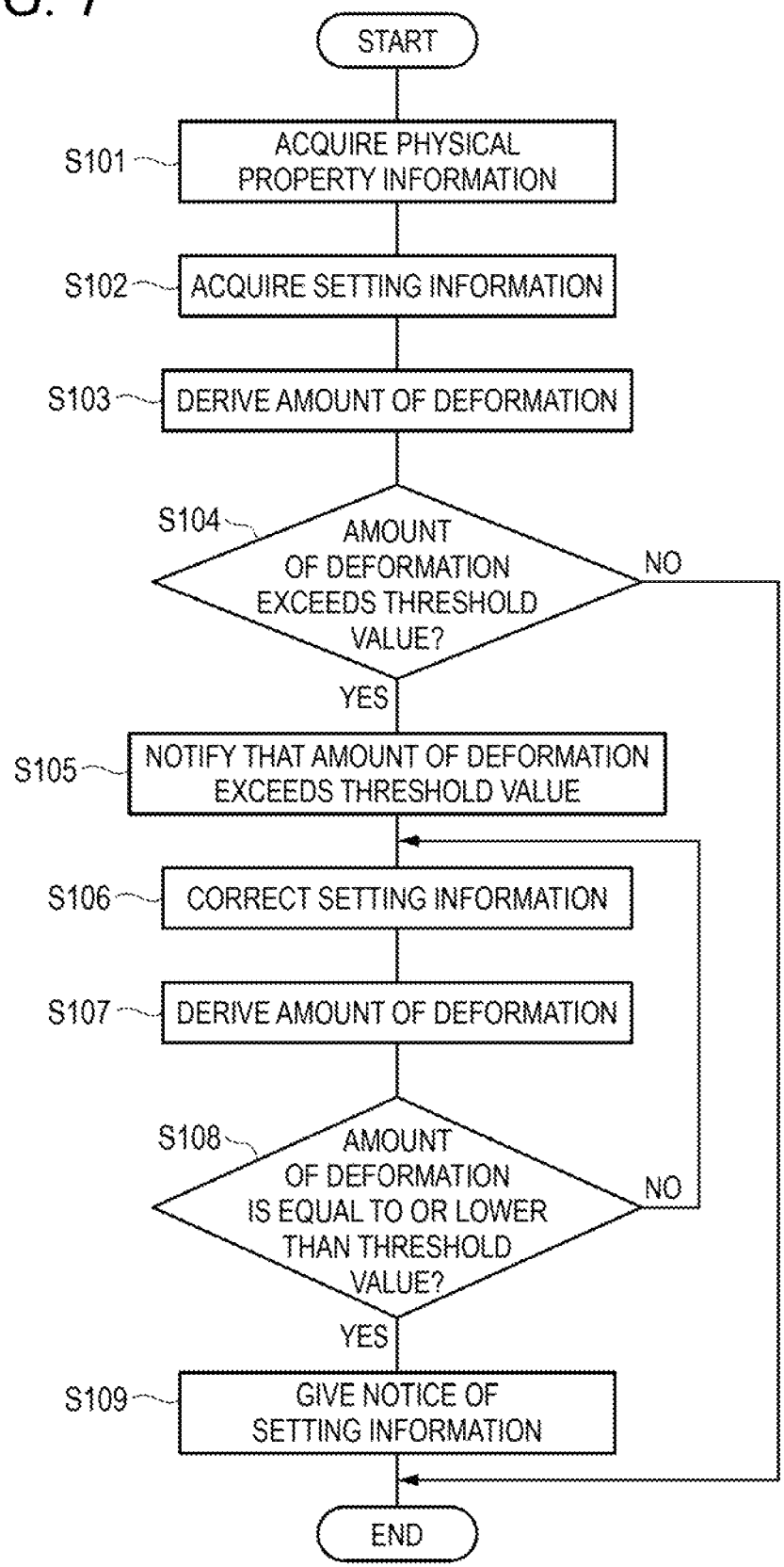
FIG. 7 is a flowchart showing an example of information processing according to the present exemplary embodiment.

As shown in FIG. 6, it may be apparent that a difference between the calculated values, of the paper wrinkle grade according to the present exemplary embodiment and the measured values of the paper wrinkle grade is sufficiently small. That is, FIG. 7 shows that the quality of an image to be formed on the recording medium 31 may be evaluated statistically from the behaviors of one drop of the ink ejected onto the recording medium 31. Using FIG. 6, $k_1$, $k_2$, and $k_3$ with which the calculated values of the paper wrinkle grade match the measured values of the paper wrinkle grade may be derived.

Next, operation of the information processing program according to the present exemplary embodiment will be described with reference to FIG. 7. FIG. 7 is a flowchart showing an example of information processing according to the present exemplary embodiment. The CPU 11 reads the information processing program from the ROM 12 or the storage 14 and executes the information processing program to execute the information processing shown in FIG. 7. The information processing shown in FIG. 7 is executed when, for example, the user inputs an instruction to execute the information processing program.

In step S101, the CPU 11 acquires the physical property information.

In step S102, the CPU 11 acquires the setting information.

In step S103, the CPU 11 derives the amount of deformation.

In step S104, the CPU 11 determines whether the amount of deformation exceeds the threshold value. When the amount of deformation exceeds the threshold value (step S104: YES), the CPU 11 proceeds to step S105. On the other hand, when the amount of deformation does not exceed the threshold value (step S104: NO), the CPU 11 ends the processing.

In step S105, the CPU 11 notifies the user that the amount of deformation exceeds the threshold value and the quality of the image to be formed is poor. Here, as the notification processing, a content to be notified may be displayed on a monitor, or the content to be notified may be transmitted to a terminal of the user.

In step S106, the CPU 11 corrects a value of the setting information and performs the correction set in the setting information. As an example, the setting information to be corrected is the image density and the printing speed. One of the image density and the printing speed may be corrected, or the image density and the printing speed may be corrected. A mode has been described in which the setting information to be corrected according to the present exemplary embodiment is the image density and the printing speed. However, the present invention is not limited thereto. For example, the volume of the ink to be ejected may be corrected.

In step S107, the CPU 11 derives the amount of deformation using the corrected setting information.

In step S108, the CPU 11 determines whether the amount of deformation is the threshold value or smaller. When the amount of deformation is the threshold value or smaller (step S108: YES), the CPU 11 proceeds to step S109. On the other hand, when the amount of deformation is larger than the threshold value (step S108: NO), the CPU 11 proceeds to step S106.

In step S109, the CPU 11 notifies the user of the corrected setting information.

The information processing program according to the present exemplary embodiment has described a mode in which the user is notified of the corrected setting information. However, the present invention is not limited thereto. For example, the corrected setting information may be set as setting information at a time of actually forming an image.

As described above, using the physical property information and the setting information, the amount of action on the recording medium 31 is derived statistically, and the information on the quality of the image is derived from the behavior of one drop of the ink ejected onto the recording medium 31. Therefore, according to the present exemplary embodiment, processing time for deriving the information on the quality of the image is reduced as compared with a case of simulating the behavior of each ink for an entire region to be printed.

The configuration of the information processing apparatus 10 described in the above exemplary embodiment is, an example, and may be changed depending on a situation without departing from the gist of the present disclosure.

The processing flow of the program described in the above exemplary embodiment is also an example, and an unnecessary step may be deleted, a new step may be added, or the processing order may be changed without departing from the gist of the present disclosure.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the above exemplary embodiment, instead of being stored (installed) in the storage medium 14 in advance, the program PR may be provided by being recorded in a recording medium such as a compact disc read only memory (CD-ROM), a digital versatile disc read only memory (DVD-ROM), and a universal serial bus (USB) memory, or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor configured to:
   acquire physical property information on physical properties of a recording medium and physical properties of ink to be ejected onto the recording medium and setting information on a setting of a device configured to eject the ink onto the recording medium;
   derive an action amount using the physical property information and the setting information, the action amount relating to action of the recording medium applied by the ink ejected onto the recording medium, wherein the processor derives, as the action amount, a deformation amount of the recording medium due to swelling; and
   output the action amount.

2. The information processing apparatus according to claim 1, wherein
   the processor derives the deformation amount using a total permeation amount of the ink that has permeated the recording medium and rigidity of the recording medium.

3. The information processing apparatus according to claim 2, wherein
   the processor derives the total permeation amount of the ink using an image density included in the setting information and a permeation coefficient of the ink for the recording medium.

4. The information processing apparatus according to claim 3, wherein,
   in a case where the action amount exceeds a predetermined threshold value, the processor gives notice that a quality of an image to be formed on the recording medium is low.

5. The information processing apparatus according to claim 4, wherein,
   in a case where the action amount exceeds the predetermined threshold value, the processor derives corrected setting information with which the action amount is equal to or lower than the predetermined threshold value and gives notice of the corrected setting information.

6. The information processing apparatus according to claim 2, wherein,
   in a case where the action amount exceeds a predetermined threshold value, the processor gives notice that a quality of an image to be formed on the recording medium is low.

7. The information processing apparatus according to claim 6, wherein,
   in a case where the action amount exceeds the predetermined threshold value, the processor derives corrected setting information with which the action amount is equal to or lower than the predetermined threshold value and gives notice of the corrected setting information.

8. The information processing apparatus according to claim 1, wherein,
   in a case where the action amount exceeds a predetermined threshold value, the processor gives notice that a quality of an image to be formed on the recording medium is low.

9. The information processing apparatus according to claim 8, wherein,
   in a case where the action amount exceeds the predetermined threshold value, the processor derives corrected setting information with which the action amount is equal to or lower than the predetermined threshold value and gives notice of the corrected setting information.

10. An information processing apparatus comprising a processor configured to:
    acquire physical property information on physical properties of a recording medium and physical properties of ink to be ejected onto the recording medium and setting information on a setting of a device configured to eject the ink onto the recording medium;
    derive an action amount using the physical property information and the setting information, the action amount relating to action of the recording medium applied by the ink ejected onto the recording medium; and output the action amount, wherein, in a case where the action amount exceeds a predetermined threshold value, the processor notifies a user that a quality of an image to be formed on the recording medium is poor.

11. The information processing apparatus according to claim 10, wherein, in a case where the action amount exceeds the predetermined threshold value, the processor derives corrected setting information with which the action amount is equal to or lower than the predetermined threshold value and gives notice of the corrected setting information.

12. The information processing apparatus according to claim 11, wherein, in a case where the action amount exceeds the predetermined threshold value, the processor corrects the setting information to achieve the action amount equal to or lower than the predetermined threshold value.

13. The information processing apparatus according to claim 10, wherein, in a case where the action amount exceeds the predetermined threshold value, the processor corrects the setting information to achieve the action amount equal to or lower than the predetermined threshold value.

14. The information processing apparatus according to claim 13, wherein the processor corrects at least one of a printing speed and an image density included in the setting information to achieve the action amount equal to or lower than the predetermined threshold value.

15. A non-transitory computer readable medium storing a program causing a computer to execute a process for information processing, the process comprising:

acquiring physical property information on physical properties of a recording medium and physical properties of ink to be ejected onto the recording medium and setting information on a setting of a device configured to eject the ink onto the recording medium;

deriving an action amount using the physical property information and the setting information, the action amount relating to action of the recording medium applied by the ink ejected onto the recording medium, wherein the action amount is derived as a deformation amount of the recording medium due to swelling; and outputting the action amount.

* * * * *